March 18, 1952  J. F. CARTER  2,589,538
LUBRICATION CABINET
Filed July 2, 1946  3 Sheets-Sheet 1
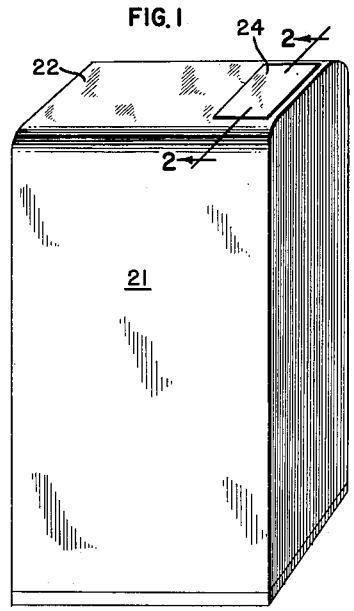
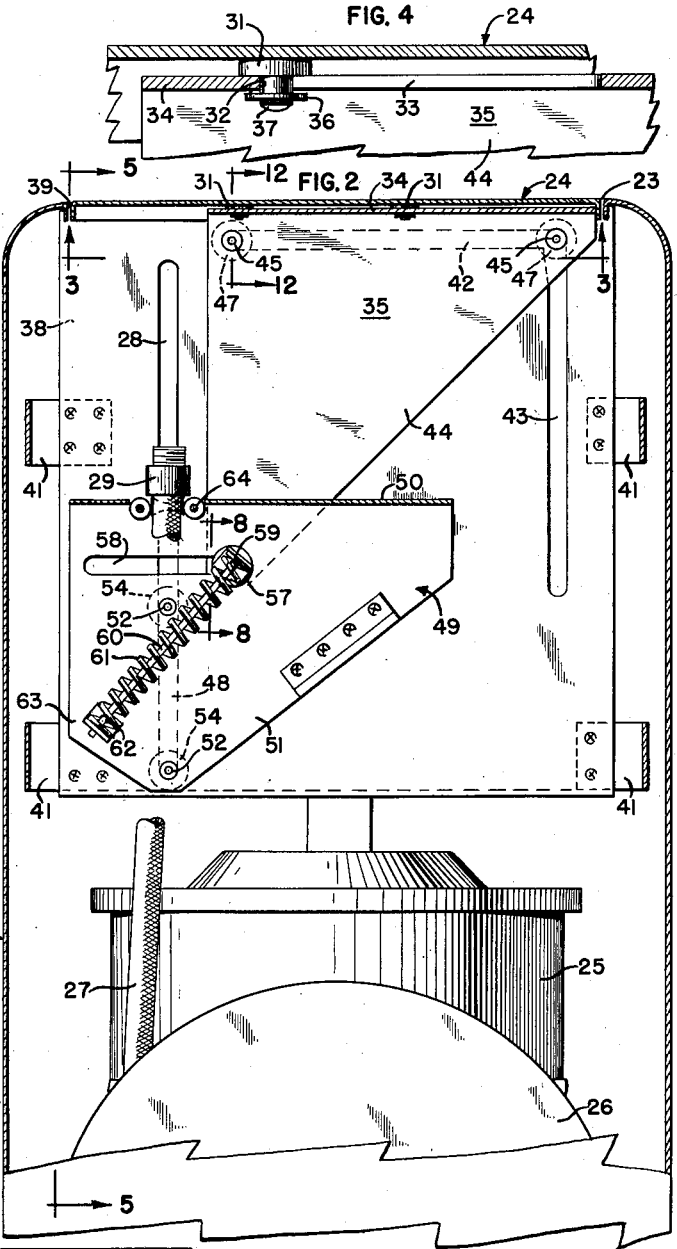
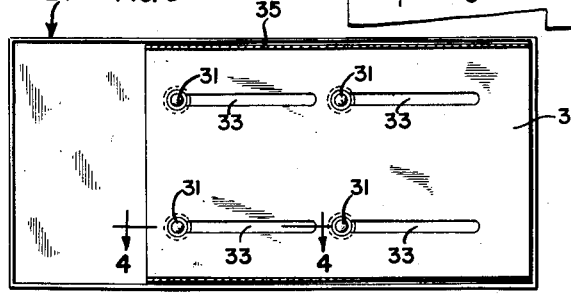
INVENTOR.
JOHN F. CARTER
BY Bair & Freeman
ATTORNEYS

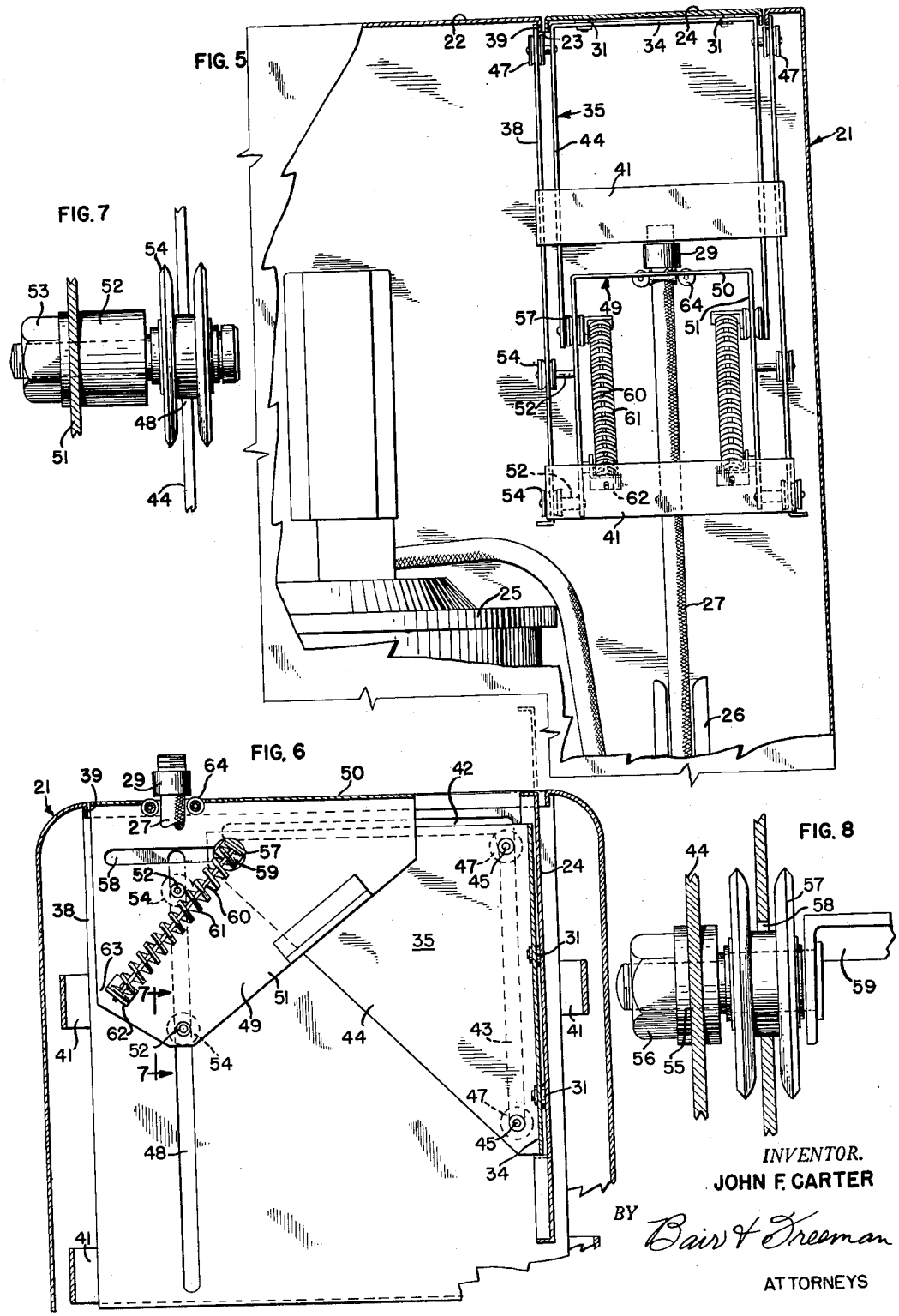

March 18, 1952  J. F. CARTER  2,589,538
LUBRICATION CABINET
Filed July 2, 1946  3 Sheets-Sheet 3

INVENTOR.
JOHN F. CARTER
BY Bair & Freeman
ATTORNEYS

Patented Mar. 18, 1952

2,589,538

UNITED STATES PATENT OFFICE 2,589,538

LUBRICATION CABINET

John F. Carter, Bryan, Ohio, assignor to The Aro Equipment Corporation, Bryan, Ohio, a corporation of Ohio Application July 2, 1946, Serial No. 681,023

7 Claims. (Cl. 222—182)

This invention relates to a lubrication cabinet and particularly to the construction and arrangement of an access door or closure and associated parts of a lubrication cabinet containing a flexible hose or conduit for lubricant.

It is an object of the invention to provide a novel closure for a lubricating cabinet which is concealed within the cabinet when in the position affording access to the lubricating device therein.

It is another object of the invention to provide a closure member for a lubricating cabinet which automatically elevates a platform or the like containing the hose for delivering lubricant to the access opening of the cabinet.

It is a further object of the invention to provide for biasing the closure member to the closed position and for biasing the device carrying the lubricating hose to the raised position by the same mechanism.

It is also an object of the invention to provide a lubrication cabinet of improved appearance and to provide a cabinet wherein all parts of the lubricating hose and nozzle or fittings are completely concealed within the cabinet when not in use.

It is an important object of the invention to provide a lubrication cabinet wherein a smooth exterior of pleasing appearance is provided, and wherein no parts of the lubricating apparatus protrude when not in use.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of the exterior of a lubrication cabinet embodying the invention showing the access door in the closed position;

Figure 2 is a partial vertical sectional view of the lubrication cabinet taken on line 2—2 of Figure 1;

Figure 3 is a partial sectional view of the lubrication cabinet taken on line 3—3 of Figure 2;

Figure 4 is an enlarged partial sectional view of the access door of the lubrication cabinet taken on line 4—4 of Figure 3;

Figure 5 is a partial vertical sectional view of the lubrication cabinet taken on line 5—5 of Figure 2;

Figure 6 is a partial sectional view similar to Figure 2 showing the access door in the open position with the hose and nozzle elevated;

Figure 7 is an enlarged detail view taken on line 7—7 of Figure 6;

Figure 8 is an enlarged detail view taken on line 8—8 of Figure 2, with the spring removed for the sake of clarity;

Figure 9:
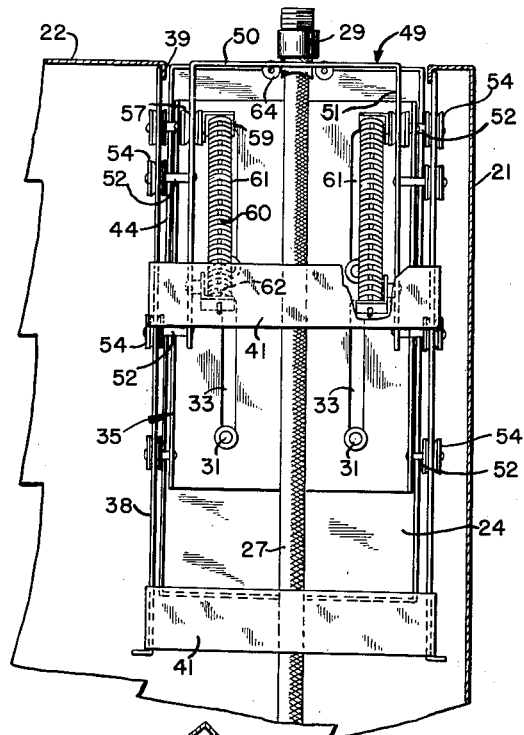
Figure 9 is a view similar to Figure 5 showing the access door open and the hose and nozzle in the raised position.
Figure 10:
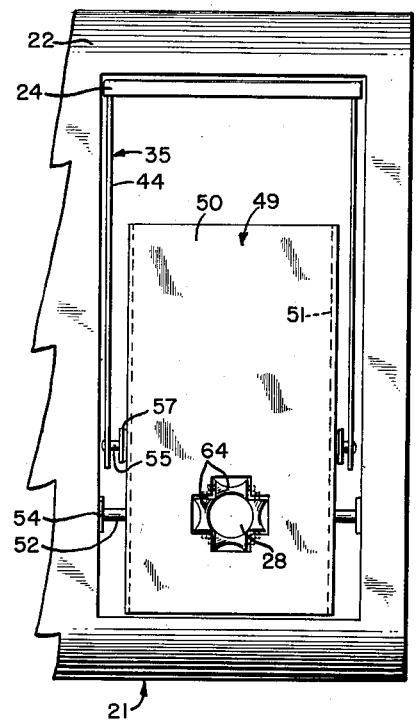
Figure 10 is a partial top view of the lubricating cabinet with the hose and nozzle elevated.

Referring specifically to the drawing for a detailed description of the invention, numeral 21 designates generally a lubrication cabinet of generally rectangular shape having a top wall 22, with an access opening 23 therein provided with a movable closure or access door 24.

Contained within the cabinet 21 is lubricating apparatus which may consist of a container for lubricant 25, a self-winding hose reel 26 of any well-known type, and a flexible delivery hose or conduit 27 adapted to be unwound from and wound on the reel 26 and provided with a nozzle 28 threaded into a fitting 29 at the end of hose 27, which fitting 29 provides a stop in a manner hereinafter described.

Figure 12:
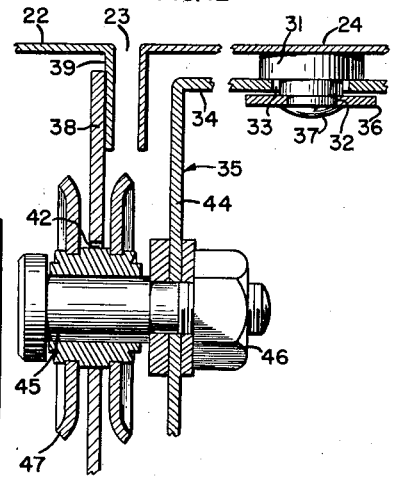
Figure 12 is an enlarged detail view, partly in section, taken on line 12—12 of Figure 2.

The closure 24 is provided with a plurality of studs 31, preferably welded thereto and provided with reduced portions 32 which enter slots 33 in a top wall 34 of a U-shaped supporting member 35, on which the closure 24 is mounted, as best shown in Figure 12. Suitable washers 36 retain the supporting member 35 on the studs 31, the studs being turned over at 37 for locking the washers 36 on the studs.

Figure 11:
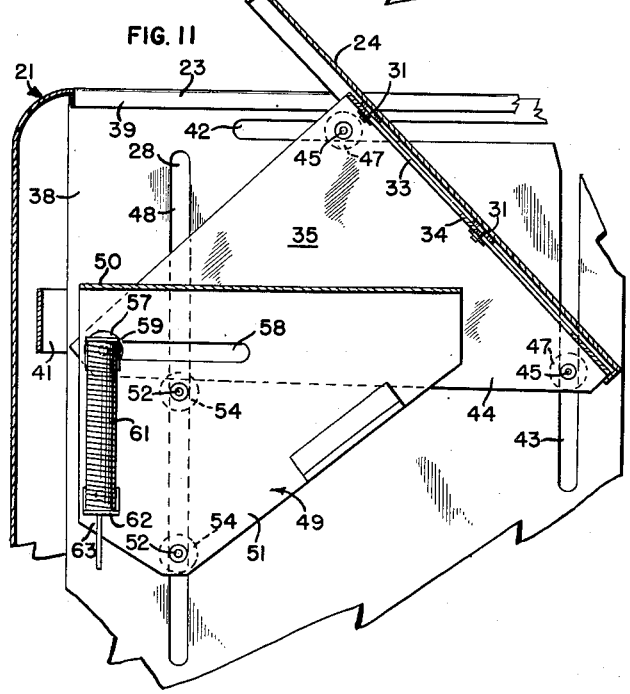
Figure 11 is a sectional view similar to Figures 2 and 6 with the parts in an intermediate position with the hose not shown.

Two vertical sheet metal walls 38 are preferably welded to flanges 39 which are turned downwardly peripherally of the access opening 23 and the walls 38 are connected together by four spaced sheet metal straps 41. As best shown in Figures 2, 11 and 12, the vertical walls 38 are provided with horizontal slots 42 and vertical slots 43 which join adjacent the top wall 22 of the cabinet at right angles.

As shown in Figures 5 and 12, the U-shaped member 35 includes vertically extending side walls 44 which are cut on an angle, as shown in Figure 2, and have two stub shafts 45 secured to each by nuts 46 adjacent their tops. The stub shafts 45 have sheaves or rollers 47 journalled thereon, which sheaves roll in the slots 42 and 43, depending upon the position of the U-shaped member 35 and the closure 24.

The fixed vertical walls 38 have another set of vertical slots 48 formed therein. A substantially U-shaped elevator 49 formed of sheet metal comprises a horizontal platform 50 and a pair of vertically extending wall members 51, as best shown in Figure 7. Two stub shafts 52 are secured to each vertical member 51 by nuts 53 and rollers or sheaves 54 are journalled on the shafts 52 and roll in the slots 48 in the fixed vertical walls 44. The vertical wall members 51 are also cut angularly as shown in Figures 2, 6 and 11.

Another stub shaft 55 is secured to each side wall 44 of the U-shaped member 35 by a nut 56, as best shown in Figure 8, and a roller or sheave 57 is journalled on each shaft 55 and roll in horizontal slots 58 formed in the vertical walls 51 of elevator 49. The stub shafts 55 have extensions 59 thereon, to which one end of compression springs 61 is secured. The other ends of the springs 61 are secured to an apertured plate 62 welded to one of the bottom corners 63 of the vertical walls 51 of elevator 49. A rod 60 extends through the spring 61, is secured to plate 59, and passes freely through the apertured plate 62.

The top wall or platform 50 of the elevator 49 is provided with an aperture therein in which four hose rollers 64 at right angles to each other are journalled. The hose 27 extends upwardly through the rollers 64 and the fitting 29 for the hose prevents the nozzle 28 from slipping downwardly through the rollers 64.

*Operation*

In the operation of the lubricant cabinet, assuming that the access door or closure 24 is in the closed position shown in Figures 1, 2 and 5, it will be noted that spring 61 is under compression and tends to force member 35 and access door 24 in a counter-clockwise direction about 45 as a pivot, thereby biasing the access door 24 towards its closed position.

When it is desired to use the lubricating apparatus, the right-hand edge of the access door 24 as viewed in Figure 2 is pushed downwardly, and reaches the position shown in Figure 11 first, and then the position shown in Figure 6. As the access door 24 moves toward the vertical position, it slides downwardly on slots 33 in member 35 and is, therefore, completely concealed within the cabinet. The member 35 carrying the access door 24 is permitted to rotate by the rollers 47 rolling along the vertical and horizontal slots 42 and 43.

As the member 35 is rotated toward the position to open the access door 24, the corner thereof, on which is mounted roller 57, swings in an arc and begins to raise elevator 49 on rollers 54 which roll upwardly in vertical slot 48. The roller 57 first moves to the left in slot 58 until the greatest arc is reached, as shown in Figure 11, and the spring 61 is completely compressed in that position. As member 35 is swung still further, roller 57 moves to the right in slot 58 and when the parts reach the position shown in Figure 6, the spring 61 is again under partial compression. The spring 61, therefore, tends to push the elevator 49 in a clockwise direction about pivot 45 and thus retain it in the opened position.

Obviously, as the elevator 49 is raised, its platform carries nozzle 28 upwardly and hose 27 is unwound from reel 26. When the elevator is raised to its highest position, the operator may grasp the nozzle and readily draw the hose 27 through the hose rollers 64 to unwind additional hose from the reel to reach the vehicle or machine to be lubricated, and when lubrication is completed, reel 26 rewinds the hose until stop 29 reaches the rollers 64.

When the lubrication job is finished, or at the end of the day, the cabinet is closed by first manually pressing down on elevator 49 and overcoming the bias of spring 61, which starts to rotate member 35 out of the cabinet. Member 35 or access door 24 is then grasped and moved to the closed position.

Although I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. A substantially closed cabinet construction for housing lubrication apparatus including a flexible hose having an outlet fitting secured thereto, said cabinet construction comprising a wall having an access opening therein, an access door for said opening, an elevator for carrying said outlet fitting from the interior of the cabinet to a position where it is accessible through said access opening, means for raising said elevator to such position responsive to movement of the access door to the open position, and common resilient means tending to maintain the access door in the closed position when it is closed and the elevator in the raised position when it is raised.

2. A substantially closed cabinet construction for housing lubrication apparatus including a flexible hose having an outlet fitting secured thereto, said cabinet construction comprising a wall having an access opening therein, an access door for said opening, an elevator for carrying said outlet fitting from the interior of the cabinet to a position where it is accessible through said access opening, means for raising said elevator to such position responsive to movement of the access door to the open position, and common means tending to maintain the access door in the closed position when it is closed and the elevator in the raised position when it is raised, said common means comprising a coil spring which is under compression in both the fully closed and fully opened positions of said access door.

3. A substantially closed cabinet construction for housing lubrication apparatus including a flexible hose having an outlet fitting secured thereto, said cabinet construction comprising a wall having an access opening therein, an access door for said opening, an elevator for carrying said outlet fitting from the interior of the cabinet to a position where it is accessible through said access opening, means for raising said elevator to such position responsive to movement of the access door to the open position, and means affording movement of said access door to a position where it is completely within the confines of said cabinet when in the fully opened position, said last means comprising a plate below said access door on which said access door is mounted, a stud on the bottom of said access door, and a track on said plate cooperating with said stud to afford free slidable movement relative to said plate.

4. A substantially closed cabinet construction for housing lubrication apparatus including a flexible hose and a self-winding reel therefor, said flexible hose having an outlet fitting thereon, said cabinet construction comprising a wall having an access opening therein, an access door for said opening, an elevator for carrying said outlet fitting from a position where it is accessible through said access opening, said elevator having tracks thereon, means on said cabinet construction cooperating with said tracks and affording vertical sliding movement of said elevator, said elevator also including means freely engaging said outlet fitting and having an aperture therein through which said hose moves as it is reeled in and out, and means for raising said elevator to such position responsive to movement of the access door to the open position, and for lowering said elevator with said outlet fitting to a position wherein both are completely concealed within said cabinet responsive to movement of the access door to the closed position.

5. A substantially closed cabinet construction for housing lubrication apparatus including a flexible hose and a self-winding reel therefor, said flexible hose having an outlet fitting thereon, said cabinet construction comprising a wall having an access opening therein, an access door for said opening, an elevator for carrying said outlet fitting from a position where it is accessible through said access opening, a member disposed interiorly of said cabinet having horizontal and vertical communicating tracks thereon, means on said access door cooperating with said tracks and affording tilting and vertical movement of said access door, and means for raising said elevator to such position responsive to movement of the access door to the open position and for lowering said elevator with said outlet fitting to a position wherein both are completely concealed within said cabinet responsive to movement of the access door to the closed position.

6. A substantially closed cabinet construction for housing lubrication apparatus including a flexible hose and a self-winding reel therefor, said flexible hose having an outlet fitting thereon, said cabinet construction comprising a wall having an access opening therein, an access door for said opening, a member disposed interiorly of said cabinet having horizontal and vertical communicating tracks thereon, means on said access door cooperating with said tracks and affording tilting and vertical movement of said access door, an elevator for carrying said outlet fitting to a position where it is accessible through said access opening, said elevator having tracks therein, means on said cabinet construction cooperating with said tracks and affording vertical sliding movement thereof, said elevator also including means freely engaging said outlet fitting and having an aperture therein through which said hose moves as it is reeled in and out by the operator.

7. A substantially closed cabinet construction for housing lubrication apparatus including a flexible hose and a self-winding reel therefor, said flexible hose having an outlet fitting thereon, said cabinet construction comprising a wall having an access opening therein, an access door for said opening, a member disposed interiorly of said cabinet having horizontal and vertical communicating tracks thereon, means on said access door cooperating with said tracks and affording tilting and vertical movement of said access door, said last means affording movement of said access door to a position where it is completely within the confines of said cabinet when in the fully opened position, an elevator for carrying said outlet fitting to a position where it is accessible through said access opening, said elevator having tracks therein, means on said cabinet construction cooperating with said tracks and affording vertical sliding movement thereof, said elevator also including means freely engaging said outlet fitting and having an aperture therein through which said hose moves as it is reeled in and out by the operator.

JOHN F. CARTER.

REFERENCES CITED

The following references are of record in the file of this patent:

UNITED STATES PATENTS

| Number | Name | Date |
| --- | --- | --- |
| 484,136 | Brown | Oct. 11, 1894 |
| 535,203 | Horrocks | Mar. 5, 1895 |
| 659,946 | Whittingham | Oct. 16, 1900 |
| 1,521,999 | Derr | Jan. 6, 1925 |
| 1,825,369 | Sibley | Sept. 29, 1931 |
| 2,148,730 | Cox | Feb. 28, 1939 |
| 2,181,521 | Reade | Nov. 28, 1939 |
| 2,411,088 | Fox | Nov. 12, 1946 |